(12) United States Patent
Aguilar et al.

(10) Patent No.: US 9,206,996 B2
(45) Date of Patent: Dec. 8, 2015

(54) WATER HEATER APPLIANCE

(71) Applicant: General Electric Company, Schenectady, NY (US)

(72) Inventors: Noel Gabriel Aguilar, Louisville, KY (US); Jonathan D. Nelson, Louisville, KY (US); Timothy David Gantt, Goshen, KY (US)

(73) Assignee: General Electric Company, Schenectady, NY (US)

( * ) Notice: Subject to any disclaimer, the term of this patent is extended or adjusted under 35 U.S.C. 154(b) by 76 days.

(21) Appl. No.: 14/147,654

(22) Filed: Jan. 6, 2014

(65) Prior Publication Data
US 2015/0192326 A1    Jul. 9, 2015

(51) Int. Cl.
*F22D 7/04* (2006.01)
*F24H 9/00* (2006.01)

(52) U.S. Cl.
CPC ......... *F24H 9/0015* (2013.01); *Y10T 137/6416* (2015.04)

(58) Field of Classification Search
USPC .................... 122/13.3, 14.22, 14.3, 429, 428; 392/461, 478, 480
See application file for complete search history.

(56) References Cited

U.S. PATENT DOCUMENTS

| | | |
|---|---|---|
| 2,716,866 A | 9/1955 | Silva |
| 3,017,162 A | 1/1962 | Haines et al. |
| 3,258,005 A * | 6/1966 | Grayson ............... 122/14.3 |
| 3,285,241 A * | 11/1966 | Bordeaux ............. 122/14.22 |
| 3,999,709 A | 12/1976 | Estabrook |
| 4,091,994 A | 5/1978 | Madsen |
| 4,175,698 A | 11/1979 | Brosenius |
| 4,290,275 A | 9/1981 | Disco et al. |
| 4,363,221 A | 12/1982 | Singh |
| 4,381,549 A | 4/1983 | Stamp, Jr. et al. |
| 4,385,723 A | 5/1983 | Sanborn et al. |
| 4,416,222 A | 11/1983 | Staats |
| 4,436,058 A | 3/1984 | McAlister |
| 4,498,622 A | 2/1985 | Harnish |
| 4,540,874 A | 9/1985 | Shaffer, Jr. et al. |
| 4,543,468 A | 9/1985 | Shaffer, Jr. et al. |
| 4,638,147 A | 1/1987 | Dytch et al. |
| 4,645,908 A | 2/1987 | Jones |
| 4,740,673 A | 4/1988 | Robinson, Jr. |
| 4,798,240 A | 1/1989 | Gerstmann et al. |
| 4,959,975 A | 10/1990 | Harris |
| 5,052,186 A | 10/1991 | Dudley et al. |
| 5,076,494 A | 12/1991 | Ripka |

(Continued)

FOREIGN PATENT DOCUMENTS

| | | |
|---|---|---|
| DE | 10345300 | 9/2006 |
| EP | 1777471 | 4/2007 |
| WO | WO 99/53248 | 10/1999 |

*Primary Examiner* — Gregory A Wilson
(74) *Attorney, Agent, or Firm* — Dority & Manning, P.A.

(57) ABSTRACT

Water heater appliances are provided. A water heater appliance includes a tank defining a chamber, the tank further defining an inlet aperture and an outlet aperture. The water heater appliance further includes a cold water conduit extending through the inlet aperture and in fluid communication with the chamber of the tank, the cold water conduit configured for directing a flow of water into the chamber of the tank. The water heater appliance further includes an alignment feature configured on the cold water conduit for orienting the cold water conduit within the chamber, the alignment feature corresponding to a mating alignment feature configured on the inlet aperture.

19 Claims, 4 Drawing Sheets

(56) References Cited

U.S. PATENT DOCUMENTS

| | | | |
|---|---|---|---|
| 5,220,807 | A | 6/1993 | Bourne et al. |
| 5,233,970 | A * | 8/1993 | Harris ................... 122/14.22 |
| 5,255,338 | A | 10/1993 | Robinson et al. |
| 5,367,602 | A | 11/1994 | Stewart |
| 5,495,551 | A | 2/1996 | Robinson, Jr. et al. |
| 5,596,952 | A | 1/1997 | Lannes et al. |
| 5,877,476 | A | 3/1999 | Yabuki et al. |
| 5,906,109 | A | 5/1999 | Dieckmann et al. |
| 5,946,927 | A | 9/1999 | Dieckmann et al. |
| 6,080,971 | A | 6/2000 | Seitz et al. |
| 6,138,614 | A | 10/2000 | Shropshire |
| 6,212,894 | B1 | 4/2001 | Brown et al. |
| 6,553,947 | B2 * | 4/2003 | Bradenbaugh ............ 122/14.3 |
| 6,640,047 | B2 | 10/2003 | Murahashi et al. |
| 7,176,352 | B1 | 2/2007 | Edelman et al. |
| 7,334,419 | B2 | 2/2008 | Gordon et al. |
| 7,543,456 | B2 | 6/2009 | Sinha et al. |
| 7,886,549 | B2 | 2/2011 | Kawakatsu et al. |
| 8,258,442 | B2 | 9/2012 | Miller et al. |
| 8,385,729 | B2 | 2/2013 | Kleman et al. |
| 8,422,870 | B2 * | 4/2013 | Nelson et al. ............. 392/461 |
| 2002/0125241 | A1 | 9/2002 | Scott et al. |
| 2006/0213210 | A1 | 9/2006 | Tomlinson et al. |
| 2007/0078528 | A1 | 4/2007 | Anke et al. |
| 2007/0157634 | A1 | 7/2007 | Hartge |
| 2009/0234513 | A1 | 9/2009 | Wiggins |
| 2010/0206869 | A1 | 8/2010 | Nelson et al. |
| 2010/0209084 | A1 | 8/2010 | Nelson et al. |
| 2011/0247572 | A1 * | 10/2011 | Smith et al. ............... 122/19.1 |
| 2012/0145095 | A1 | 6/2012 | Nelson et al. |

* cited by examiner

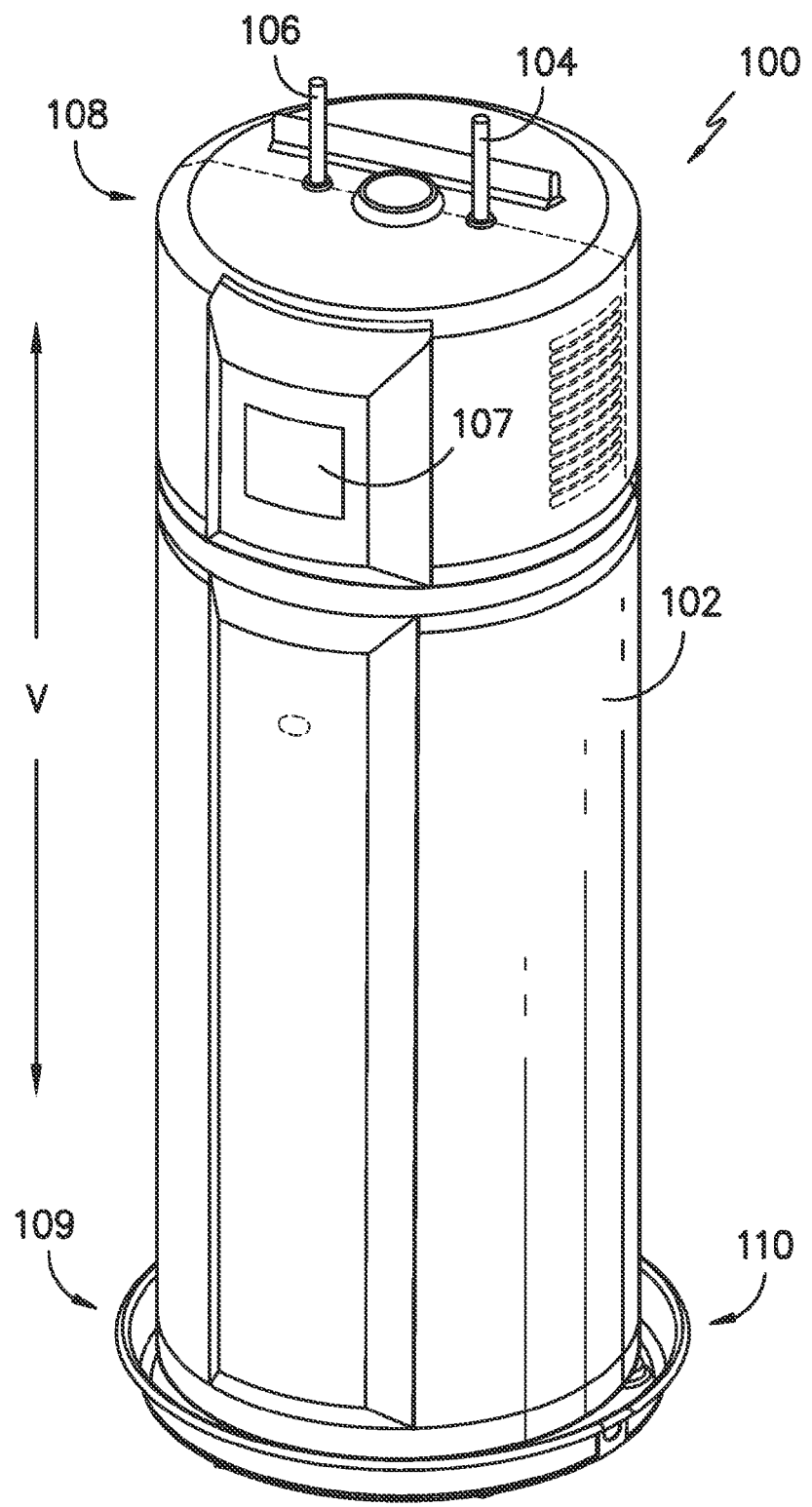
FIG. —1—

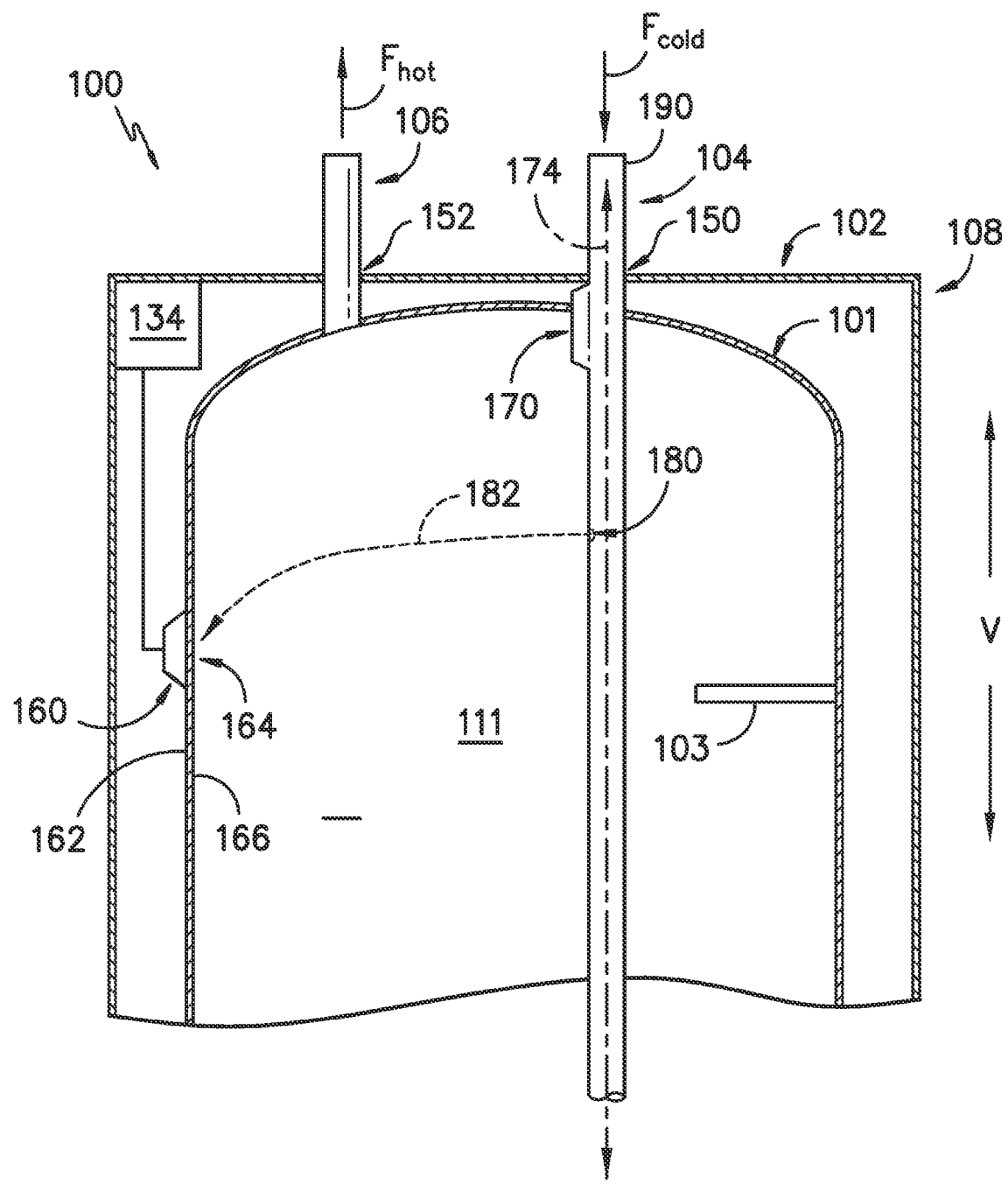
FIG. -2-

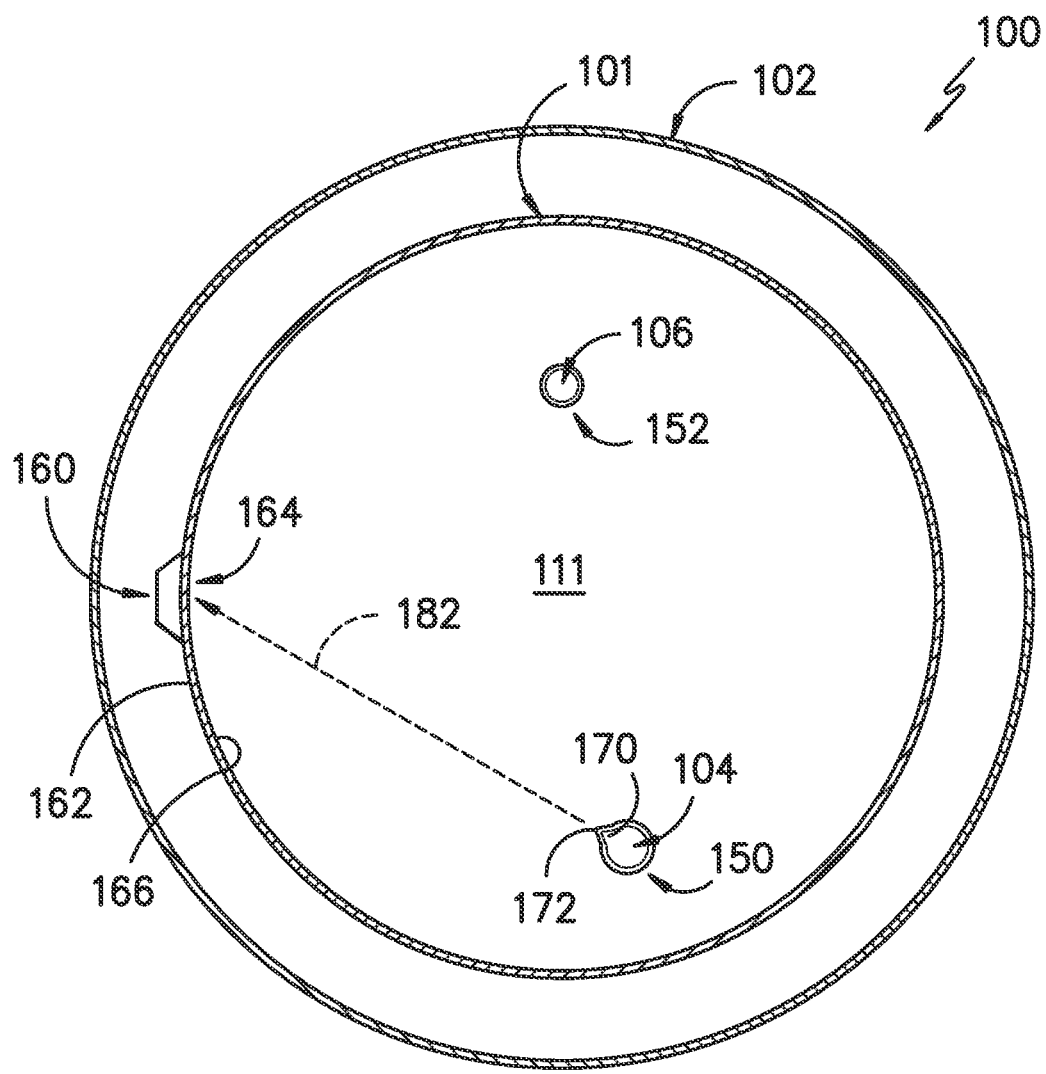
FIG. -3-

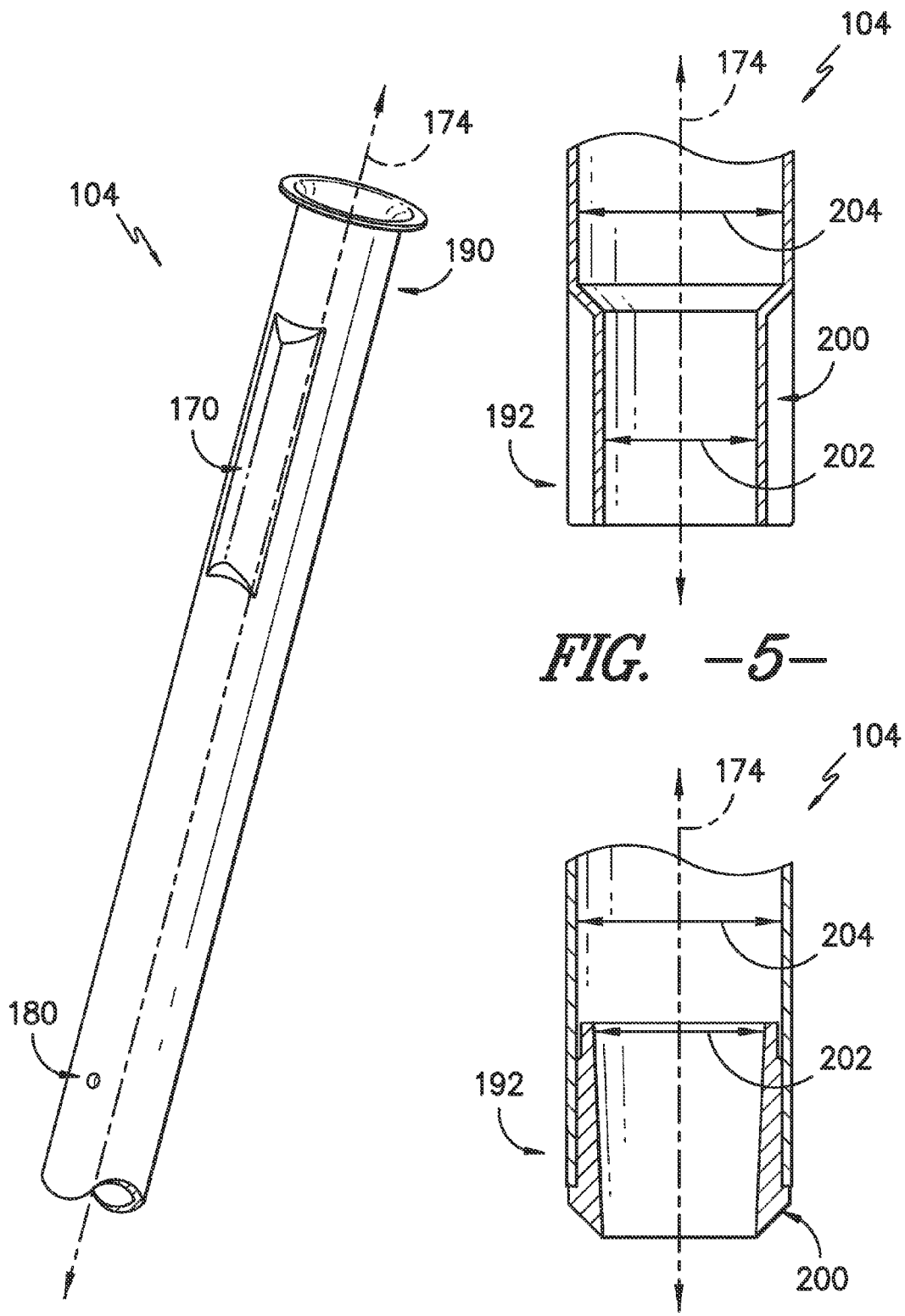
FIG. -4-
FIG. -5-
FIG. -6-

WATER HEATER APPLIANCE

FIELD OF THE INVENTION

The present subject matter relates generally to water heater appliances, and more particularly to apparatus for orienting water heater appliance components and improving flow event detection.

BACKGROUND OF THE INVENTION

Certain water heater appliances include a tank therein. Heating elements, such as gas burners, electric resistance elements, or induction elements, heat water within the tank during operation of such water heater appliances. In particular, the heating elements generally heat water within the tank to a predetermined temperature. The predetermined temperature is generally selected such that heated water within the tank is suitable for showering, washing hands, etc.

During operation, relatively cool water flows into the tank, and the heating elements operate to heat such water to the predetermined temperature. Temperature sensors are typically included in water heater appliances to, among other things, determine the temperature of the water in the tank. Many water heater appliances utilize multiple temperature sensors. However, a recent trend has been to utilize a single temperature sensor, to reduce the cost of the water heater appliance.

It is generally desirable to be able to detect flow events in a water heater appliance, when cool water is added to the water heater appliance due to, for example, the flow of heated water from the appliance for downstream use. It is also generally desirable to know the amount of water being added during a flow event. Recently, methods have been developed for utilizing temperature sensors to determine added water volume during a flow event. In general, temperature decay during a flow event is monitored. Algorithms have been developed which correspond the temperature decay to the added volume during the flow event. Such methods are disclosed, for example, in U.S. Patent Application Publication No. 2010/0206869 entitled "Heat Pump Water Heater Control", U.S. Pat. No. 8,422,870 entitled "Residential Heat Pump Water Heater", and U.S. Patent Application Publication No. 2012/0145095 entitled "Residential Heat Pump Water Heater", all of which are incorporated by reference herein in their entireties.

However, in many cases, it may be difficult for temperature decay during a flow event to be monitored by a temperature sensor. Accordingly, improved water heater appliances are desired in the art. In particular, water heater appliances which provide improved temperature decay and flow event detection would be advantageous.

BRIEF DESCRIPTION OF THE INVENTION

In accordance with one embodiment, a water heater appliance is disclosed. The water heater appliance includes a tank defining a chamber, the tank further defining an inlet aperture and an outlet aperture, and a heating element for heating water within the chamber of the tank. The water heater appliance further includes a hot water conduit extending through the outlet aperture and in fluid communication with the chamber of the tank, the hot water conduit configured for directing a flow of water out of the chamber of the tank. The water heater appliance further includes a cold water conduit extending through the inlet aperture and in fluid communication with the chamber of the tank, the cold water conduit config- ured for directing a flow of water into the chamber of the tank. The water heater appliance further includes a alignment feature configured on the cold water conduit for orienting the cold water conduit within the chamber, the alignment feature corresponding to a mating alignment feature configured on the inlet aperture.

In accordance with another embodiment, a water heater appliance is disclosed. The water heater appliance includes a tank defining a chamber, the tank further defining an inlet aperture and an outlet aperture, and a heating element for heating water within the chamber of the tank. The water heater appliance further includes a hot water conduit extending through the outlet aperture and in fluid communication with the chamber of the tank, the hot water conduit configured for directing a flow of water out of the chamber of the tank. The water heater appliance further includes a cold water conduit extending through the inlet aperture and in fluid communication with the chamber of the tank, the cold water conduit configured for directing a flow of water into the chamber of the tank, the cold water conduit further defining an auxiliary aperture and including a restricted portion having a maximum width less than a maximum width of a remainder of the cold water conduit. The water heater appliance further includes a temperature sensor configured on the tank, wherein the auxiliary aperture is aligned such that the temperature sensor can detect water exhausted through the auxiliary aperture.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 1 provides a perspective view of a water heater appliance in accordance with one embodiment of the present disclosure.

FIG. 2 provides a side cross-sectional view of a water heater appliance in accordance with one embodiment of the present disclosure.

FIG. 3 provides a top cross-sectional view of a water heater appliance in accordance with one embodiment of the present disclosure.

FIG. 4 provides a perspective view of a second end of a cold water conduit for a water heater appliance in accordance with one embodiment of the present disclosure.

FIG. 5 provides a side cross-sectional view of a first end of a water heater appliance in accordance with one embodiment of the present disclosure.

FIG. 6 provides a side cross-sectional view of a first end of a water heater appliance in accordance with another embodiment of the present disclosure.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a perspective view of a water heater appliance 100 according to an exemplary embodiment of the present subject matter. Water heater appliance 100 includes a casing 102. A tank 101 (FIG. 2) and heating elements 103 (FIG. 2) are positioned within casing 102 for heating water therein. Heating elements 103 may include a gas burner, a heat pump, an electric resistance element, a microwave element, an induction element, or any other suitable heating element or combination thereof. As will be understood by those skilled in the art and as used herein, the term "water" includes purified water and solutions or mixtures containing water and, e.g., elements (such as calcium, chlorine, and fluorine), salts, bacteria, nitrates, organics, and other chemical compounds or substances.

Water heater appliance 100 also includes a cold water conduit 104 and a hot water conduit 106 that are both in fluid communication with a chamber 111 (FIG. 2) defined by tank 101. As an example, cold water from a water source, e.g., a municipal water supply or a well, can enter water heater appliance 100 through cold water conduit 104 (shown schematically with arrow labeled $F_{cool}$ in FIG. 2). From cold water conduit 104, such cold water can enter chamber 111 of tank 101 wherein it is heated with heating elements 103 to generate heated water. Such heated water can exit water heater appliance 100 at hot water conduit 106 (shown schematically with arrow labeled $F_{hot}$ in FIG. 2) and, e.g., be supplied to a bath, shower, sink, or any other suitable feature.

Water heater appliance 100 extends longitudinally between a top portion 108 and a bottom portion 109 along a vertical direction V. Thus, water heater appliance 100 is generally vertically oriented. Water heater appliance 100 can be leveled, e.g., such that casing 102 is plumb in the vertical direction V, in order to facilitate proper operation of water heater appliance 100. A drain pan 110 is positioned at bottom portion 109 of water heater appliance 100 such that water heater appliance 100 sits on drain pan 110. Drain pan 110 sits beneath water heater appliance 100 along the vertical direction V, e.g., to collect water that leaks from water heater appliance 100 or water that condenses on an evaporator (not shown) of water heater appliance 100. It should be understood that water heater appliance 100 is provided by way of example only and that the present subject matter may be used with any suitable water heater appliance.

Water heater appliance 100 may further include a controller 134 that is configured for regulating operation of water heater appliance 100. Controller 134 may be in operative communication with various components of the water heater appliances, including, for example, heating elements 103 and a temperature sensor as discussed herein as well as a control panel 107. Control panel 107 may include various displays and input controls for user interface with the appliance 100. Controller 134 can, for example, selectively activate heating elements 103 in order to heat water within chamber 102 of tank 101.

Controller 134 includes memory and one or more processing devices such as microprocessors, CPUs or the like, such as general or special purpose microprocessors operable to execute programming instructions or micro-control code associated with operation of water heater appliance 100. The memory can represent random access memory such as DRAM, or read only memory such as ROM or FLASH. The processor executes programming instructions stored in the memory. The memory can be a separate component from the processor or can be included onboard within the processor. Alternatively, controller 134 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Referring to FIGS. 1 through 3, tank 101 may define an inlet aperture 150 and an outlet aperture 152. The inlet and outlet apertures 150, 152 may be provided to facilitate the flow of water into and from the chamber 111. For example, cold water conduit 104 may extend through inlet aperture 150, and hot water conduit 106 may extend through outlet aperture 152. Apertures 150, 152 may in exemplary embodiments be define on an upper portion of the tank 101 along the vertical direction V, such that the conduits 104, 106 extend generally vertically into the chamber 111.

In exemplary embodiments, appliance 100 may include a temperature sensor 160. Temperature sensor 160 may generally sense the temperature in the appliance 100, such as of water in the chamber 111, and may for example be in operative communication with the controller 134. As discussed, temperature sensor 160 may measure temperature decay and facilitate flow even detection when cold water is flowing through cold water conduit 104.

In exemplary embodiments as illustrated, temperature sensor 160 may be configured on an outer surface 162 of the tank 101. Temperature sensor 160 may for example be connected to the outer surface 162 using suitable mechanical fasteners, or may be mounted using, for example, an adhesive, welding, brazing, etc. A target sensor location 164 may be defined on an inner surface 166 of the tank 101 at the location on the tank wherein the sensor 160 is located. In other words, the target sensor location 164 may be the mirror location on the inner surface 166 of the location of the sensor 160 on the outer surface 162, relative to the tank 101 wall.

Referring now to FIGS. 2 through 6, cold water conduit 104 may include various features for orienting the conduit 104 when inserted in the inlet aperture 150. Such features may advantageously facilitate improved, accurate temperature decay and flow event detection for the appliance 100. For example, a alignment feature 170 may be configured on the cold water conduit 104. The alignment feature 170 may orient the cold water conduit 104 within the chamber 111, as discussed herein. For example, the alignment feature 170 may correspond to a mating alignment feature 172 configured on the inlet aperture 150.

Alignment and mating alignment features 170, 172 in accordance with the present disclosure are generally mistake-proofing features that facilitate the correct orientation of the cold water conduit 104 in the inlet conduit 150 and prevent incorrect orientations. As illustrated, the alignment feature 170 in exemplary embodiments is a protrusion extending from the cold water conduit 104. The protrusion may have any suitable shape and size. For example, in some embodiments as illustrated, the protrusion may be a generally wedge-shaped protrusion extending from the cold water conduit 104. In exemplary embodiments, the alignment feature 170 may be integral with the conduit 104. In other words, the conduit 104 and alignment feature 170 may be formed from a singular piece of material. In other embodiments, the alignment feature 170 may be, for example, connected to the conduit 104 using a suitable mechanical fastener or mounted to the conduit 104 using, for example, an adhesive, welding, brazing, etc.

As mentioned, alignment feature 170 may correspond to a mating alignment feature 172 configured on the inlet aperture 150. As illustrated, the mating alignment feature 172 in exemplary embodiments is a depression defined in the inlet aperture 150. The depression may have any suitable shape and size, and may generally correspond to the shape and size of the protrusion. For example, in some embodiments as illustrated, the depression may be a generally wedge-shaped depression defined in the inlet aperture 150.

As discussed, the alignment feature 170 and mating alignment feature 172 may facilitate orientation of the cold water conduit 104. For example, cold water conduit 104 may be rotatable about a longitudinal axis 174. Interaction between the alignment feature 170 and mating alignment feature 172 may ensure that, when the conduit 104 is disposed in and extending through the inlet aperture 150, the conduit 104 is in a specific orientation with respect to the longitudinal axis 174. As discussed herein, such orientation advantageously facilitates accurate temperature decay and flow event detection for the appliance 100.

In exemplary embodiments, cold water conduit 104 further includes an auxiliary aperture 180 defined therein. Auxiliary aperture 180 allows a portion of water flowing through cold water conduit 104 to flow therefrom. Further, in exemplary embodiments, auxiliary aperture 180 is aligned such that the temperature sensor 160 can detect water exhausted through the auxiliary aperture 180. For example, such water exhausted from the auxiliary aperture 180 may contact a location on the tank 101 relative to the temperature sensor 160, such as the target sensor location 164 or a location proximate the target sensor location 164. Thus, auxiliary aperture 180 may be aligned with the temperature sensor 160. For example, as illustrated, auxiliary aperture 180 may be defined in the conduit 104 in a predetermined position relative to the alignment feature 170, such that when the alignment feature 170 and mating alignment feature 172 are engaged, the auxiliary aperture 180 is aligned with the temperature sensor 160. In some embodiments, for example, auxiliary aperture 180 may be vertically aligned with the alignment feature 170, such that the auxiliary aperture 180 and alignment feature 170 are generally in the same specific orientation with respect to the longitudinal axis 174. When the alignment feature 170 and mating alignment feature 172 are engaged, the auxiliary aperture 180 may for example be aligned with the temperature sensor 160 such that water flowing from the auxiliary aperture 180 is directed towards the sensor 160 or a location proximate sensor 160.

Referring to FIG. 3, desired alignment of the auxiliary aperture 180 with the temperature sensor 160 is illustrated, with reference arrow 182 indicating the direction of water flow. Such alignment is generally with respect to specific orientations about an axis defined by the vertical direction V, as illustrated in FIG. 3, rather than relative to specific locations along the vertical direction. For example, in general, the auxiliary aperture 180 may be at any suitable location above the temperature sensor 160 along the vertical direction V. However, it is desirable that the auxiliary aperture 180 be aligned with the temperature sensor 160 about the vertical direction.

Referring to FIGS. 2 and 4 through 6, cold water conduit 104 extends between a first end 190 and a second end 192. The first end 190, as illustrated, is disposed within the chamber 111 when the conduit 104 is assembled in the water heater assembly 100. The second end 192, as illustrated, is disposed external to the chamber 111 when the conduit 104 is assembled in the water heater assembly 100. In exemplary embodiments, the alignment feature 170 is disposed proximate the second end 192 (relative to the first end 190).

As illustrated in FIGS. 5 and 6, a cold water conduit 104 may in exemplary embodiments further include a restricted portion 200, which may be disposed at (as illustrated) or proximate to the first end 190 of the cold water conduit 104. Restricted portion 200 generally define a maximum internal width (or diameter) 202 which is less than a maximum internal width 204 at any other location along a remainder of the cold water conduit 104. Further, such restricted portion 200 may, due to the smaller width, have a cross-sectional area less than a cross-sectional area at any other location along a remainder of the cold water conduit 104. By narrowing the area through which water in the cold water conduit 104 can flow, the restricted portion 200 creates a back pressure in the cold water conduit 104. Such back pressure may advantageously facilitate a stronger exhaust flow of water through the auxiliary aperture 180 towards the temperature sensor 160, such that this flow of water can contact the tank 101 wall at this location, such as at the target sensor location 164.

In some exemplary embodiments, as illustrated in FIG. 5, restricted portion 200 may be integral with the cold water conduit 104. For example, restricted portion 200 may be a portion of the cold water conduit 104 manufactured with a smaller width and cross-sectional area. In other exemplary embodiments, as illustrated in FIG. 6, restricted portion 200 may be an insert that is disposed at least partially within the cold water conduit 104, such as at the first end 190 as illustrated. Restricted portion 200 in these embodiments may, for example, have a width 202 as discussed, and may be inserted into the cold water conduit 104 to adjust the width 204 of a portion of the cold water conduit 104. In exemplary embodiments, the restricted portion 200 may be sonic welded to the conduit 104. Alternatively, the restricted portion 200 may be otherwise configured on the conduit 104, such as through connection, mounting, etc.

The various features as disclosed herein, such as the alignment feature 170 and mating alignment feature 172, the auxiliary aperture 180, and the restricted portion 200, advantageously facilitate improved temperature decay and flow event detection for water heater appliances 100. For example, as discussed, temperature sensor 160 measurements can be utilized and calibrated to determine temperature and decay and flow event detection. The various features disclosed herein advantageously ensure that the cold water conduit is properly oriented with respect to the temperature sensor 160, such that for example water flowing from auxiliary aperture 180 contacts the target sensor location 164. Such contact by this water facilitates improved accuracy in temperature decay and flow event detection.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A water heater appliance, comprising:
   a tank defining a chamber, the tank further defining an inlet aperture and an outlet aperture;
   a heating element for heating water within the chamber of the tank;
   a hot water conduit extending through the outlet aperture and in fluid communication with the chamber of the tank, the hot water conduit configured for directing a flow of water out of the chamber of the tank;
   a cold water conduit extending through the inlet aperture and in fluid communication with the chamber of the tank, the cold water conduit configured for directing a flow of water into the chamber of the tank; and
   an alignment feature configured on the cold water conduit for orienting the cold water conduit within the chamber, the alignment feature corresponding to a mating alignment feature configured on the inlet aperture, the alignment feature and mating feature causing the cold water conduit to be positioned in a specific orientation about a longitudinal axis within the chamber and preventing the cold water conduit from being positioned in orientations about the longitudinal axis other than the specific orientation.

2. The water heater appliance of claim 1, wherein the alignment feature is a protrusion extending from an outer surface of the cold water conduit, and wherein the mating alignment feature is a depression defined in the inlet aperture.

3. The water heater appliance of claim 1, wherein the alignment feature is integral with the cold water conduit.

4. The water heater appliance of claim 1, wherein the water heater appliance further comprises a temperature sensor configured on the tank, and wherein an auxiliary aperture defined in the cold water conduit is aligned with the temperature sensor when the alignment feature and mating alignment feature are engaged.

5. The water heater appliance of claim 4, wherein the temperature sensor is configured on an outer surface of the tank.

6. The water heater appliance of claim 4, wherein a portion of water flowing through the cold water conduit is exhausted from the auxiliary aperture and contacts the tank at the temperature sensor location.

7. The water heater appliance of claim 6, wherein the cold water conduit extends between a first end disposed within the chamber and a second end disposed external to the chamber, and wherein the restricted portion is disposed at the first end.

8. The water heater appliance of claim 6, wherein the restricted portion is integral with the cold water conduit.

9. The water heater appliance of claim 6, wherein the restricted portion is an insert disposed at least partially within the cold water conduit.

10. The water heater appliance of claim 1, wherein the cold water conduit comprises a restricted portion having a maximum width less than a maximum width of a remainder of the cold water conduit.

11. A water heater appliance, comprising:
    a tank defining a chamber, the tank further defining an inlet aperture and an outlet aperture;
    a heating element for heating water within the chamber of the tank;
    a hot water conduit extending through the outlet aperture and in fluid communication with the chamber of the tank, the hot water conduit configured for directing a flow of water out of the chamber of the tank;
    a cold water conduit extending through the inlet aperture and in fluid communication with the chamber of the tank, the cold water conduit configured for directing a flow of water into the chamber of the tank, the cold water conduit further defining an auxiliary aperture and comprising a restricted portion having a maximum width less than a maximum width of a remainder of the cold water conduit; and
    a temperature sensor configured on the tank, wherein the auxiliary aperture is aligned such that the temperature sensor can detect water exhausted through the auxiliary aperture, and wherein a flow of water through the cold water conduit and exhausted from the auxiliary aperture is directed from the auxiliary aperture towards and contacts the tank at the temperature sensor location.

12. The water heater appliance of claim 11, further comprising an alignment feature configured on the cold water conduit for orienting the cold water conduit within the chamber, the alignment feature corresponding to a mating alignment feature configured on the inlet aperture.

13. The water heater appliance of claim 12, wherein the alignment feature is a protrusion extending from an outer surface of the cold water conduit, and wherein the mating alignment feature is a depression defined in the inlet aperture.

14. The water heater appliance of claim 12, wherein the alignment feature is integral with the cold water conduit.

15. The water heater appliance of claim 12, wherein the auxiliary aperture is aligned with the temperature sensor when the alignment feature and mating alignment feature are engaged.

16. The water heater appliance of claim 11, wherein the temperature sensor is configured on an outer surface of the tank.

17. The water heater appliance of claim 11, wherein the cold water conduit extends between a first end disposed within the chamber and a second end disposed externa' to the chamber, and wherein the restricted portion is disposed at the first end.

18. The water heater appliance of claim 11, wherein the restricted portion is integral with the cold water conduit.

19. The water heater appliance of claim 11, wherein the restricted portion is an insert disposed at least partially within the cold water conduit.

* * * * *